Jan. 12, 1932.  W. HARDY  1,840,775
DETACHABLE HANDLE FOR COOKING UTENSILS
Filed March 14, 1931
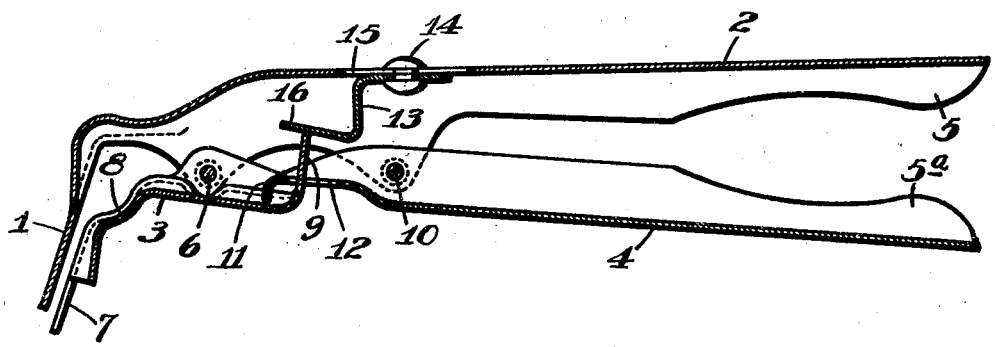
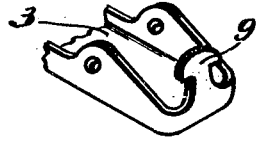
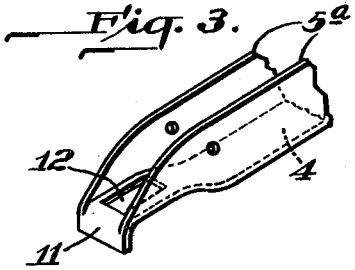
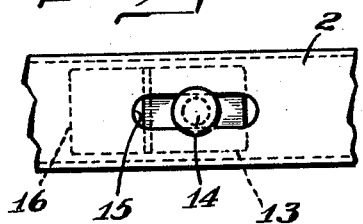
WITNESSES
A. B. Wallace
F. B. Flick
INVENTOR
William Hardy
By Brown & Critchlow
his attorneys.

Patented Jan. 12, 1932

1,840,775

UNITED STATES PATENT OFFICE

WILLIAM HARDY, OF NEW KENSINGTON, PENNSYLVANIA, ASSIGNOR TO THE ALUMINUM COOKING UTENSIL COMPANY, OF NEW KENSINGTON, PENNSYLVANIA, A CORPORATION OF PENNSYLVANIA

DETACHABLE HANDLE FOR COOKING UTENSILS

Application filed March 14, 1931. Serial No. 522,676.

This invention relates to detachable handles for utensils, and particularly to means for locking such devices in position on a utensil.

The commercially available detachable handle devices intended for use with handleless utensils have been objectionable because as soon as the gripping members are released the handle falls away from the utensil. This necessitates reapplication of the handle to the utensil, which is a source of annoyance and inconvenience where such utensils are to be moved frequently. However, up to the time of this invention no practical means has been available for locking such handles in position on the utensil, the locking means suggested heretofore being cumbersome and lacking utility.

It is among the objects of this invention to provide detachable utensil handles with simple and effective means for holding the handle in position on a utensil, which do not interfere with operation of the handle, are operable by the hand grasping the handle, and may be embodied in existing types of handles during their production without any substantial change therein.

The preferred embodiment is shown in the accompanying drawings, in which Fig. 1 is a longitudinal section through the handle; Figs. 2 and 3 fragmentary perspective views of the cooperating ends of the movable jaw and pivoted arm; and Fig. 4 a fragmentary plan view of the upper arm showing the slidably mounted locking member.

The handle shown in the drawings is of a conventional type comprising fixed jaw and handle members 1 and 2 respectively, a movable jaw member 3, and an arm 4 actuating the movable jaw. All of these parts are pressed from metallic sheet or plate, the fixed jaw and handle being preferably struck from a single piece, and the sides of the handle and arm being bent to form side flanges 5 and 5a, Fig. 1. The movable jaw member is pivotally connected to flanges 5, as by a pin 6, and it is provided at one end with a jaw portion 7 adapted to cooperate with jaw 1 to grip the side of a utensil. Grooves 8 are formed in the jaws to accommodate utensils having beaded edges. The other end of member 3 has an actuating tip 9 projecting toward handle 2. Arm 4 is pivotally connected at 10 to handle 2, and it engages tip 9 for actuation of the movable jaw. In the embodiment shown the end of arm 4 is bent downwardly to form a lip 11, and adjacent thereto is a slot 12 through which tip 9 passes. When the device is assembled, handle 2 and arm 4 form gripping members. When pressure is applied to them lip 11 bears against member 3 to move its jaw into gripping engagement with the side of a utensil disposed between the jaws.

In accordance with this invention, the handle is provided with locking means which engage or act directly upon the movable member to hold the jaws in gripping position when the handle and arm are released. In the embodiment shown in Figs. 1 and 4 a latch 13 is connected to the underside of handle 2 by a rivet 14 movable in a longitudinal slot 15 formed in the handle. The free end 16 of the latch presses against tip 9 when the latch is moved in the slot, thus preventing jaw 7 from dropping away from the utensil when manual pressure on the handle is released. As shown in Fig. 1, end 16 is sloped. This provides a wide variety of locking positions, depending on the position of movable member 3 and tip 9, and effectively locks the handle on utensils of varying wall thickness.

The handle is applied to and used with containers in the customary manner, latch 13 being retracted when the handle is applied, and when it is not to be locked on the utensil. The handle being in position on a utensil, it may be locked thereon by pushing the latch forward until it presses firmly against tip 9. When so locked the handle will remain on the utensil after the grips have been released.

A particular feature of this device is that the locking member can be actuated by a finger of the same hand that grips the handle, thereby leaving the other hand free. Furthermore, being contained within the handle, it is not cumbersome or awkward to operate as those known heretofore have been. The saving of time made possible by, and the convenience in, having such a handle equipped with one of these efficient locking devices, is readily apparent.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A detachable handle for utensils, comprising a handle member adapted to be grasped in the hand and provided with a fixed jaw, a movable jaw pivotally connected to said member, a movable handle arm pivotally connected to said handle member and adapted to be grasped simultaneously therewith, said movable arm operatively engaging said movable jaw to positively move it into gripping engagement with a portion of a utensil disposed between said jaws, and adjustable locking means associated with said handle member for engaging said movable jaw to lock it in gripping position.

2. A detachable handle for utensils, comprising a stationary member having fixed jaw and slotted handle portions, a movable member pivotally connected to said stationary member, said movable member including a jaw adapted to cooperate with said stationary jaw to grip the side of a utensil, and a tip extending toward said handle, an arm pivotally connected to said handle and operatively connected to said tip to force said movable jaw into gripping contact with said utensil when the arm and handle are gripped, and a latch slidably mounted in said slot for engagement with said tip to lock the jaws in gripping position on the utensil.

In testimony whereof, I sign my name.

WILLIAM HARDY.